(12) United States Patent　　　　(10) Patent No.: US 12,584,809 B2

Grandl et al.　　　　　　　　　　(45) Date of Patent: Mar. 24, 2026

(54) TORQUE SENSOR HAVING A RADIALLY ELASTIC MATERIAL SECTION

(71) Applicant: SENSODRIVE GMBH, Wessling (DE)

(72) Inventors: Michael Grandl, Munich (DE); Christian Rust, Germering (DE); Mathias Sattler, Stamberg (DE)

(73) Assignee: SENSODRIVE GMBH, Wessling (DE)

( * ) Notice: Subject to any disclaimer, the term of this patent is extended or adjusted under 35 U.S.C. 154(b) by 523 days.

(21) Appl. No.: 18/011,012

(22) PCT Filed: Jul. 13, 2021

(86) PCT No.: PCT/EP2021/069453

§ 371 (c)(1),
(2) Date: Dec. 16, 2022

(87) PCT Pub. No.: WO2022/013214

PCT Pub. Date: Jan. 20, 2022

(65) Prior Publication Data

US 2023/0236080 A1　　Jul. 27, 2023

(30) Foreign Application Priority Data

Jul. 16, 2020　　(DE) ..................... 10 2020 004 286.4

(51) Int. Cl.
G01L 1/22　　　　(2006.01)
G01L 3/14　　　　(2006.01)

(52) U.S. Cl.
CPC .......... G01L 3/1457 (2013.01); G01L 1/2231 (2013.01)

(58) Field of Classification Search
CPC ....... G01L 1/22; G01L 1/2206; G01L 1/2231; G01L 3/14; G01L 3/1457
See application file for complete search history.

(56) References Cited

U.S. PATENT DOCUMENTS 6,324,919 B1　12/2001　Larsen et al.
10,209,151 B2 *　2/2019　Okada ...................... G01L 3/10
(Continued)

FOREIGN PATENT DOCUMENTS

CN　　101400978 A　　4/2009
CN　　106153237 A　　11/2016
(Continued)

OTHER PUBLICATIONS

PCT International Search Report and Written Opinion completed by the ISA/EP on Oct. 13, 2021 and issued in connection with PCT/EP2021/069453.
(Continued)

*Primary Examiner* — Erika J. Villaluna

(74) *Attorney, Agent, or Firm* — Barnes & Thornburg LLP

(57)　　　　　　ABSTRACT

The invention relates to a torque sensor (10) with a main body (12) that extends in an axial and circumferential direction, and which extends in a radial direction of the main body from an annular inner flange (18) with first force introduction points (16) via a mechanically weakened sensor portion (20), which is provided with measuring sensors that generate output signals, to an annular outer flange (32) with second force introduction points (34), wherein the second force introduction points (34) are connected to the sensor portion (20) via a radially elastic material portion (28). The radially elastic material portion (28) is formed by multiple radially elastic bending strips 31), which are arranged in a distributed manner around a circumference of the main body (12), and is connected to the mechanically weakened sensor portion (20) via an annular, radially stiff decoupling region (27).

15 Claims, 7 Drawing Sheets

(56) References Cited

U.S. PATENT DOCUMENTS

Figures 9, 10, 11, 12:
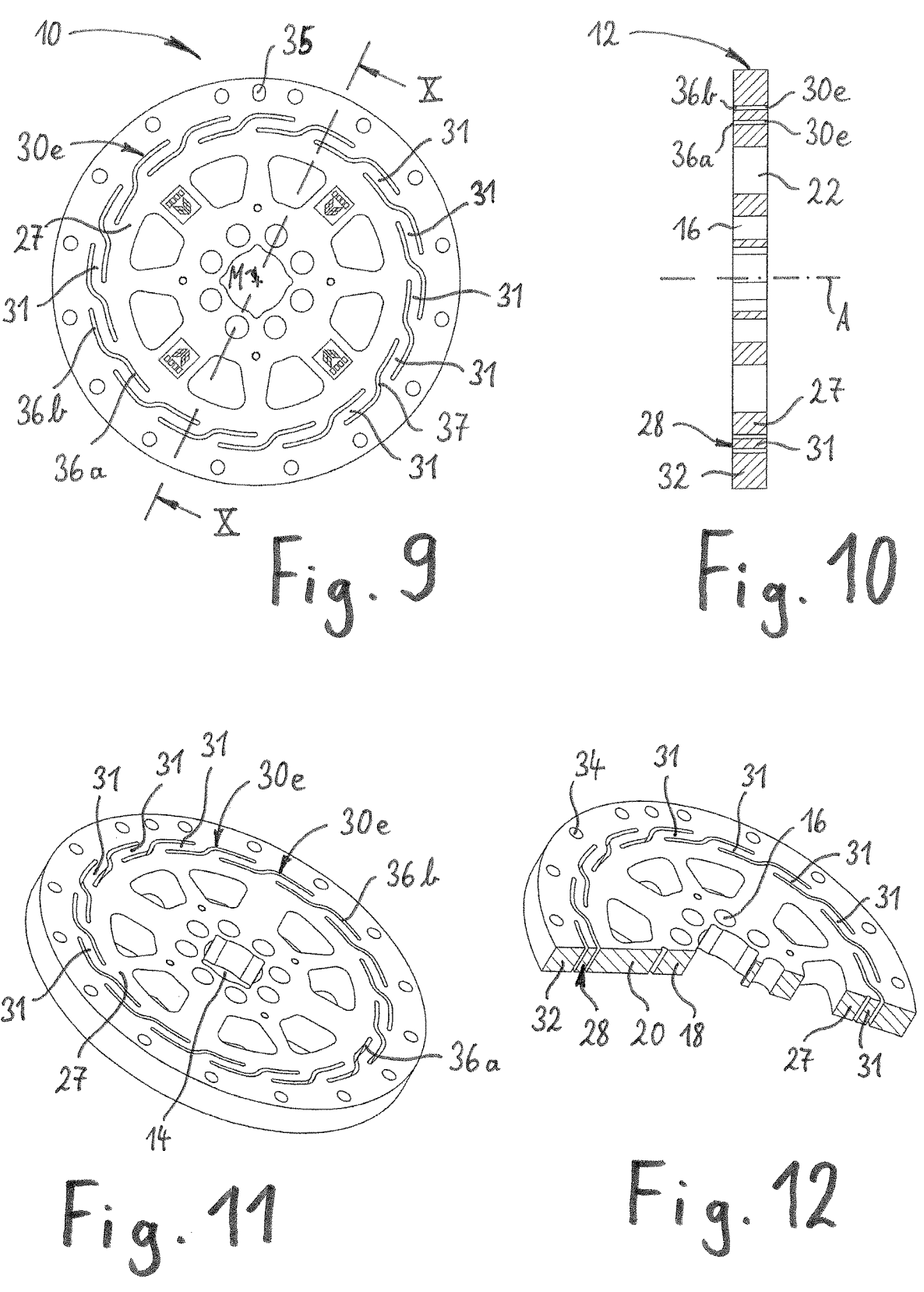

| | | |
|---|---|---|
| 2009/0013803 A1 | 1/2009 | Lohr et al. |
| 2019/0187013 A1 | 6/2019 | Haehnle et al. |
| 2019/0271604 A1 | 9/2019 | Li et al. |
| 2019/0275681 A1 | 9/2019 | Böhme et al. |

FOREIGN PATENT DOCUMENTS

| | | |
|---|---|---|
| CN | 109642836 A | 4/2019 |
| CN | 110050180 A | 7/2019 |
| DE | 19627385 A1 | 1/1998 |
| DE | 10304359 A1 | 11/2003 |
| DE | 202010005613 U1 | 9/2010 |
| DE | 102012024264 A1 | 6/2014 |
| DE | 102016012324 A1 | 4/2018 |
| WO | 2007104939 A1 | 9/2007 |
| WO | 2018/041948 A1 | 3/2018 |

OTHER PUBLICATIONS

PCT International Preliminary Report on Patentability mailed May 27, 2022 and issued in connection with PCT/EP2021/069453.
German Office Action mailed Mar. 17, 2021 and issued in connection with German Patent Appln. No. 10 2020 004 286.4.

\* cited by examiner

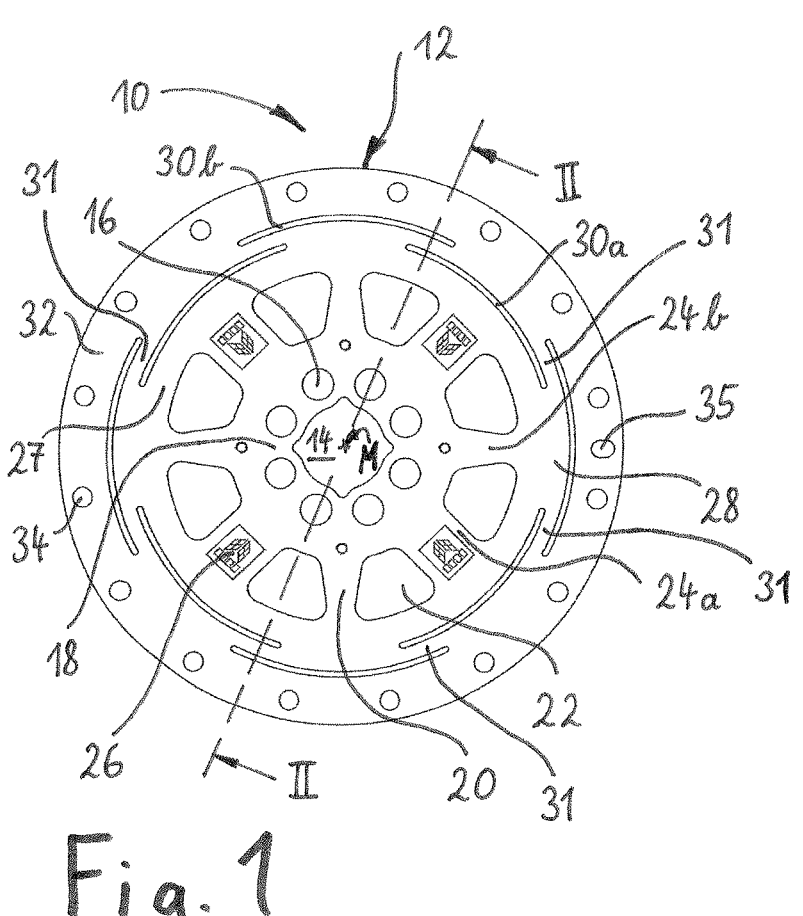
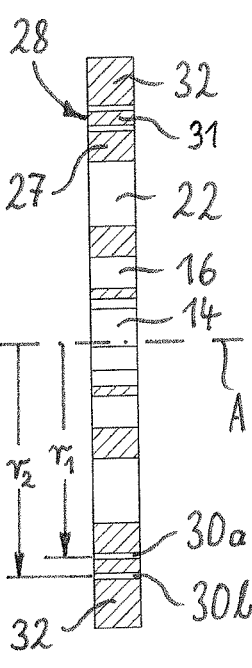
Fig. 1
Fig. 2
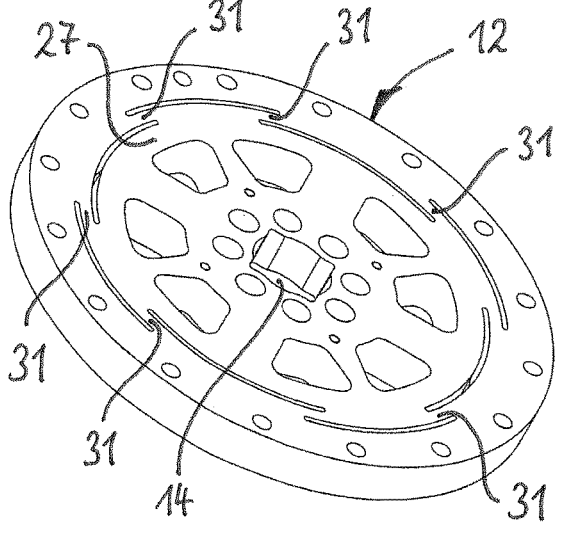
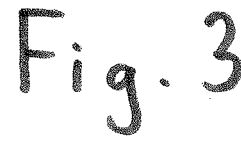
Fig. 3
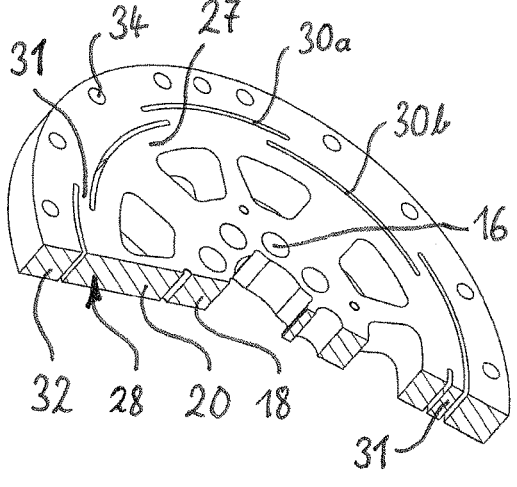
Fig. 4

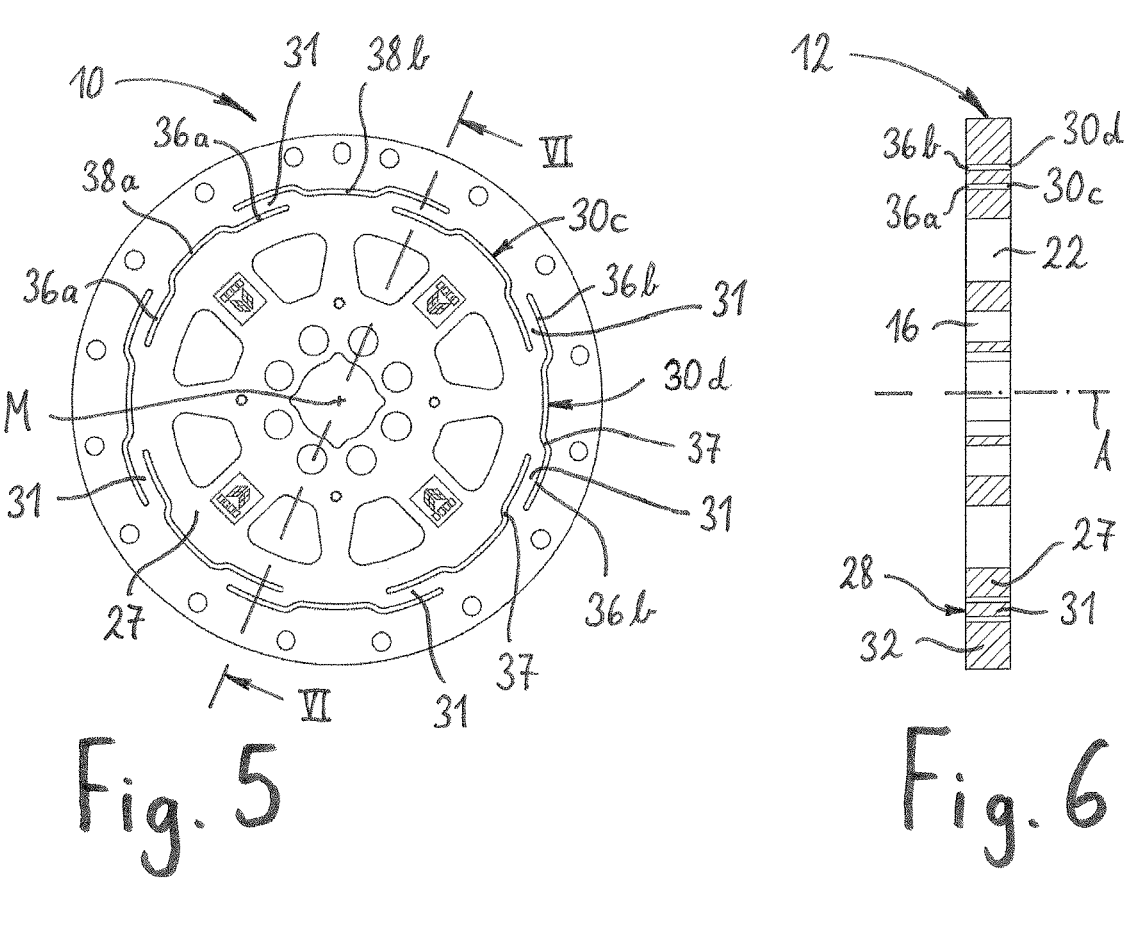
Fig. 5
Fig. 6
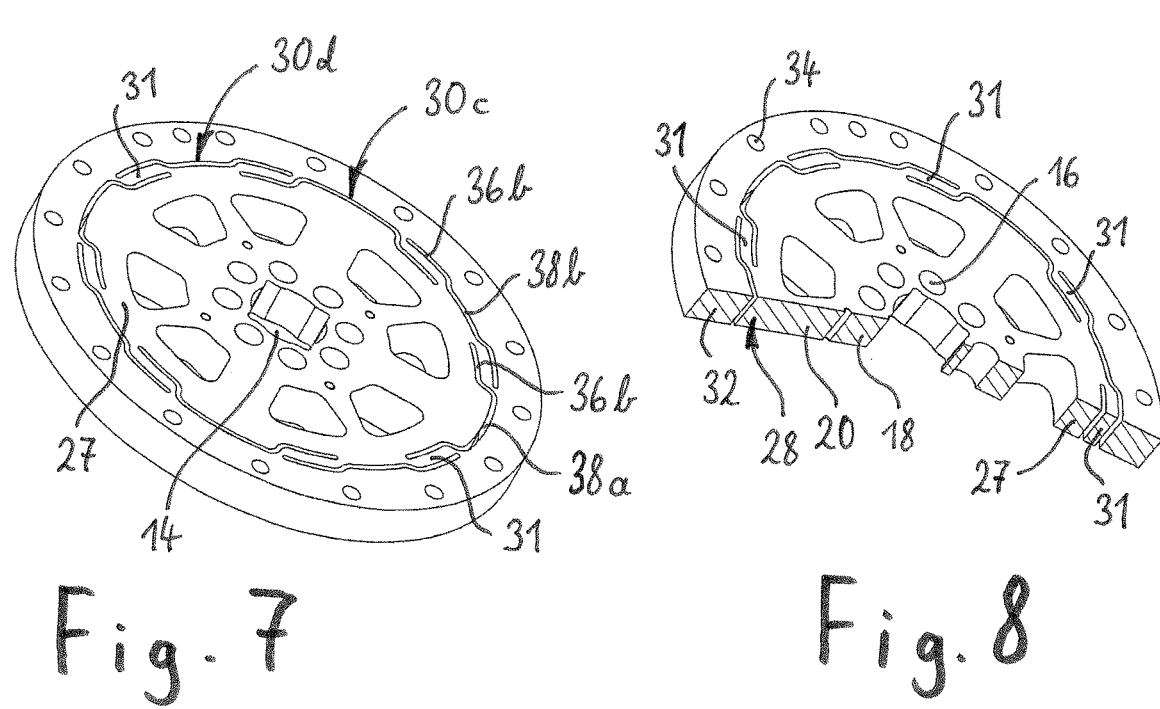
Fig. 7
Fig. 8

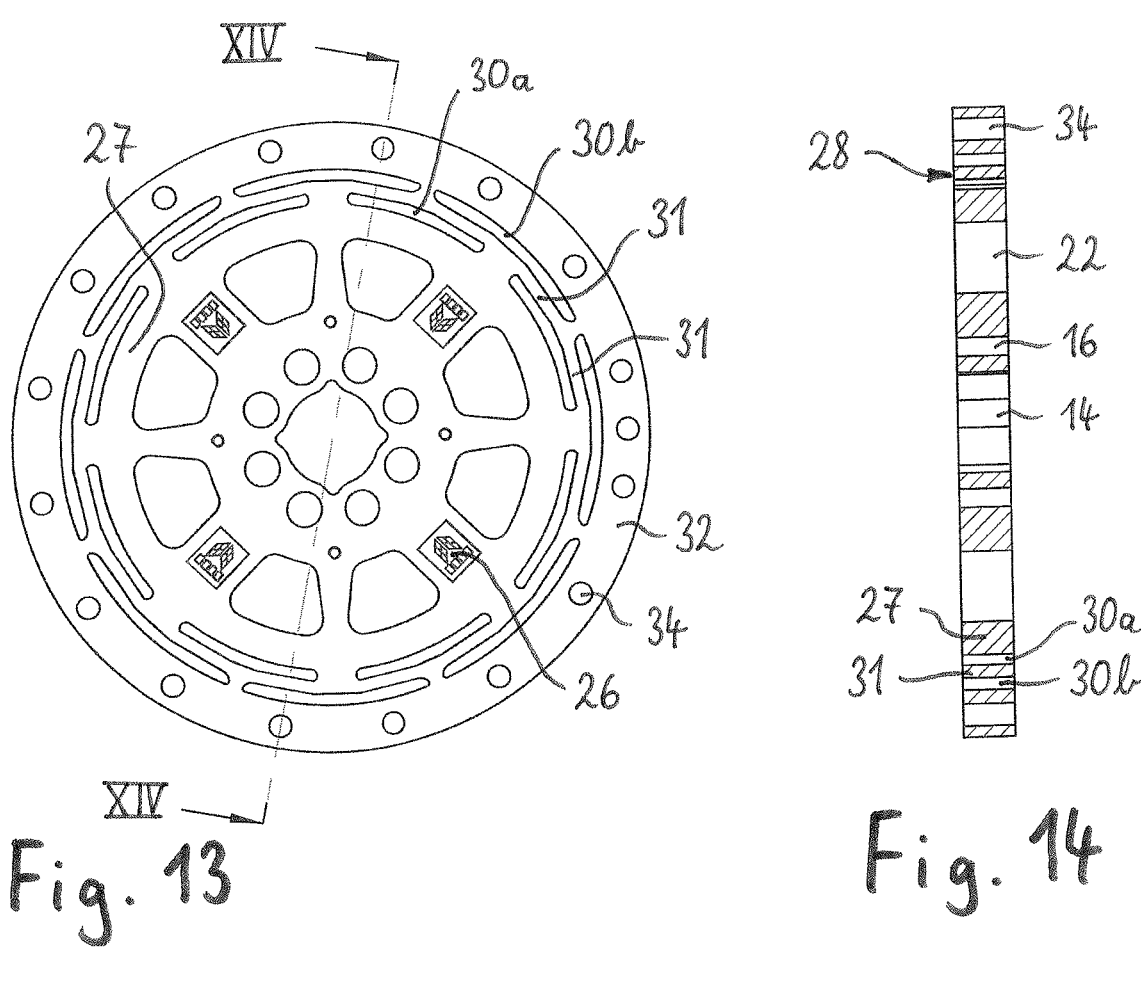
Fig. 13
Fig. 14
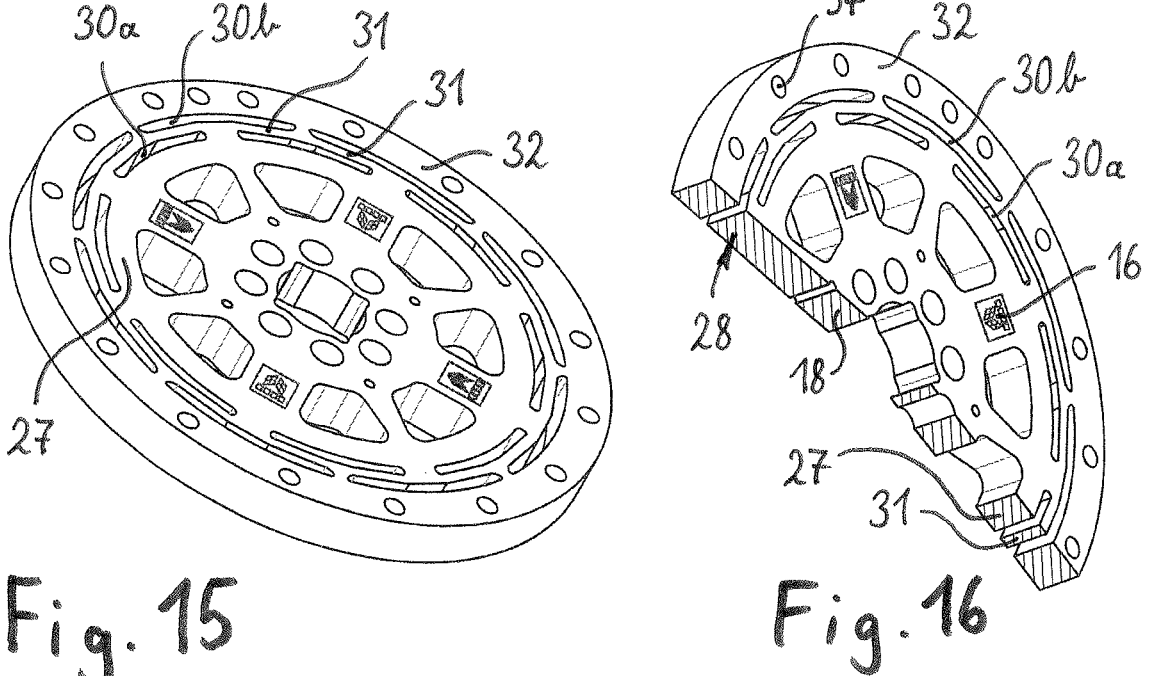
Fig. 15
Fig. 16

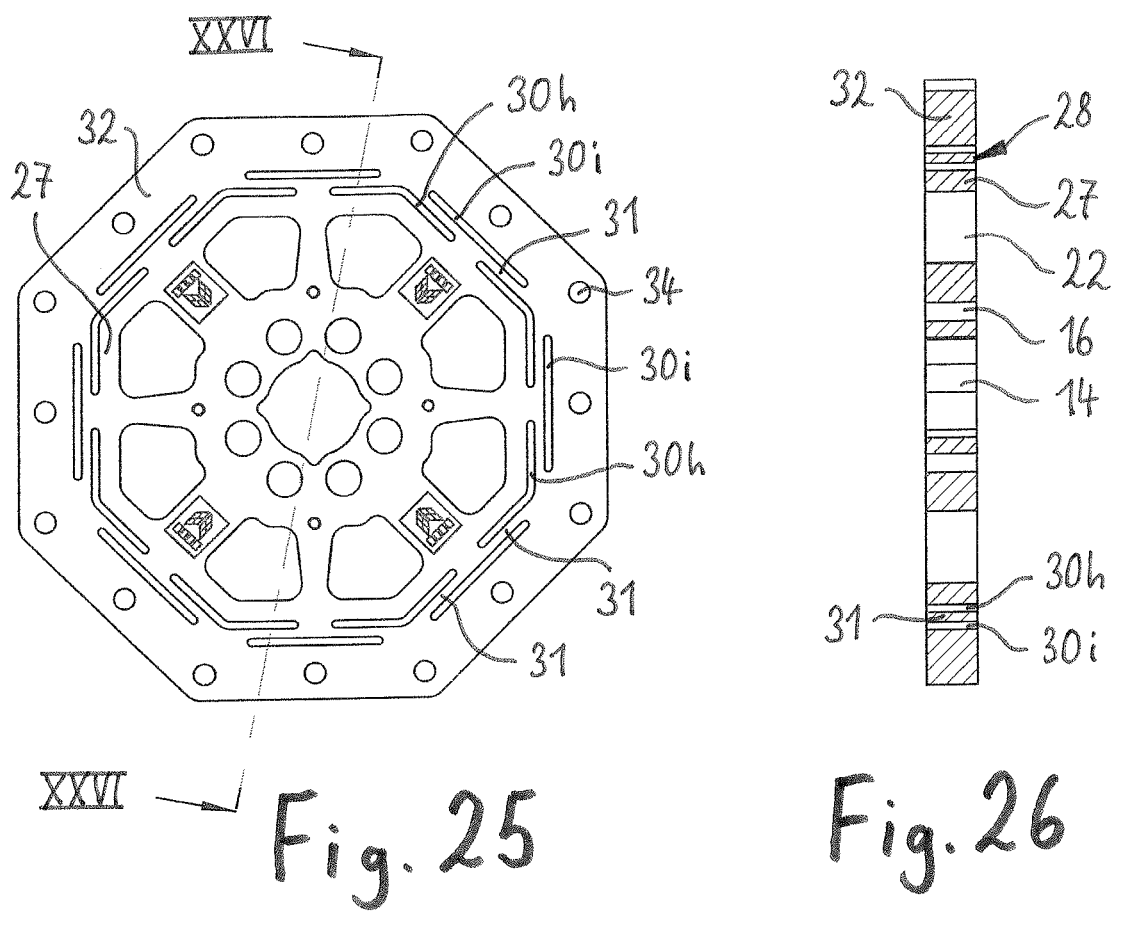
Fig. 25
Fig. 26
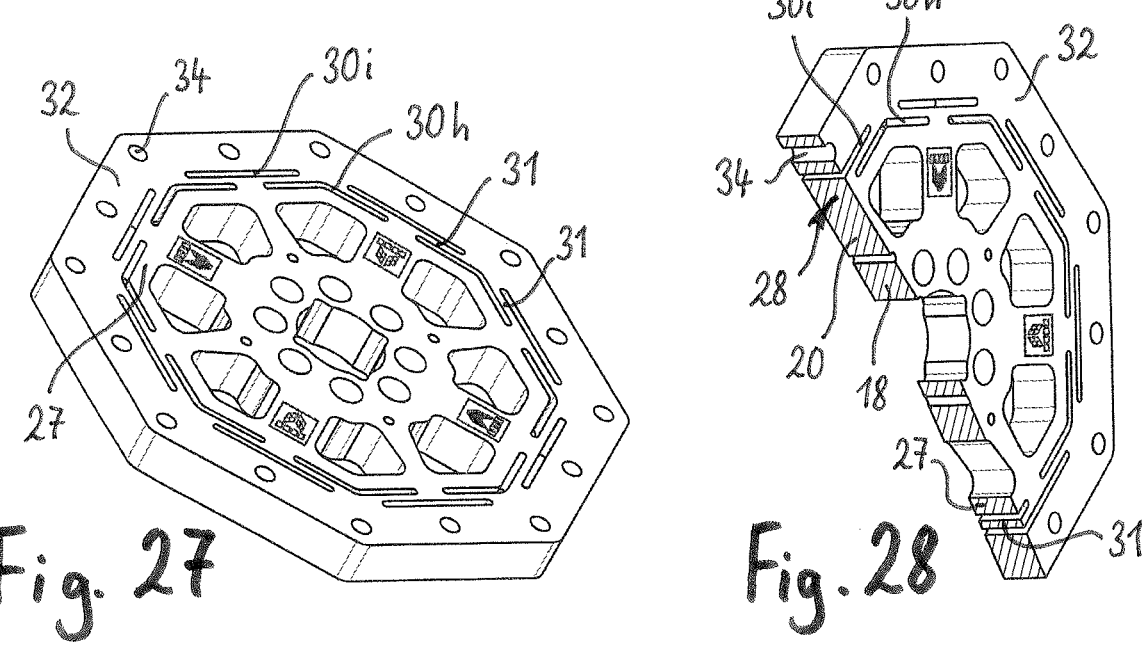
Fig. 27
Fig. 28

TORQUE SENSOR HAVING A RADIALLY ELASTIC MATERIAL SECTION

CROSS-REFERENCE TO RELATED APPLICATIONS

This application is a U.S. national stage entry of PCT Application No. PCT/EP2021/069453, filed Jul. 13, 2021, which claims the benefit of, and priority to German Patent Application No. 102020004286.4 filed Jul. 16, 2020.

The invention relates to a torque sensor having a main body extending axially and in a circumferential direction, which torque sensor extends in a radial direction of the main body from an annular inner flange with first force introduction points via a mechanically weakened sensor portion, which is provided with measuring transducers for generating output signals, to an annular outer flange with second force introduction points, wherein the second force introduction points are connected to the sensor portion via a radially elastic material portion.

Such a torque sensor is known from WO 2018/041948. With this known torque sensor, a high degree of decoupling can be achieved in the radial direction. In other words, it is possible to prevent radially directed forces acting on the torque sensor from leading to measurement errors. Such radially directed forces can result, for example, from roundness deviations at the second force introduction points caused by manufacturing tolerances. The consequence of such roundness deviations can be crosstalk of the measuring transducers. In order to avoid measurement errors which can be caused by radially acting forces, the radially elastic material portion in the known torque sensor is in the form of a thin-walled material portion extending in the axial direction of the main body. Owing to the thin-walled form, this radially elastic material portion has a low stiffness in respect of radial deformations but is virtually rigid in respect of torsional forces, that is to say has high stiffness in respect of torsional forces. However, the thin-walled material portion extending in the axial direction of the known torque sensor results in an increased axial dimension of the torque sensor as a whole.

The object of the invention is to provide a torque sensor which retains the insensitivity of the known torque sensor to mechanical interference, in particular its insensitivity to radially acting forces, and additionally allows a more compact structural form to be achieved.

This object is achieved, starting from a torque sensor of the generic type described above, in that the radially elastic material portion is formed by a plurality of radially elastic bending strips which are arranged distributed over a circumference of the main body, and in that the radially elastic material portion is connected to the mechanically weakened sensor portion via an annular, radially stiff decoupling region.

The radially elastic bending strips can readily be so designed that they require less or at least not more installation space in the axial direction than the remaining regions, or portions, of the main body. For example, the bending strips can be formed by a series of slots which pass through the radially elastic material portion in the axial or radial direction. The slots preferably extend at least substantially in the circumferential direction, but embodiments are also possible in which the slots have a linear or linearly bent profile. Within the scope of the present disclosure, the term "slot" means in particular that the width of an opening formed by the slot is very much smaller than the longitudinal extent of the opening.

The number of radially elastic bending strips can be chosen relatively freely. In order, when seen over the entire circumference, to achieve good decoupling relative to radially acting forces, preferably at least three bending strips are arranged distributed over the circumference of the main body. Particularly preferably, however, more than three radially elastic bending strips are provided, for example four, five, six, seven or eight radially elastic bending strips. It is readily possible to provide even significantly more radially elastic bending strips, for example sixteen radially elastic bending strips. The number of radially elastic bending strips actually used can be dependent on the structural form and size of the main body and in particular on the space available on the main body. In principle, a larger number of radially elastic bending strips allows the decoupling relative to radially acting forces to be made uniform, but even three or four radially elastic bending strips are sufficient for good decoupling relative to radially acting forces.

The provision of the annular, radially stiff decoupling region between the weakened sensor region and the radially elastic material portion prevents forces absorbed by the radially elastic material portion from affecting the weakened sensor region. In other words, the annular, radially stiff decoupling region ensures that the weakened sensor region is not or is virtually not affected by what happens in the radially elastic material region.

Overall, the use of the radially elastic bending strips in the configuration of the radially elastic material portion, in combination with the annular, radially stiff decoupling region, makes it possible for the second force introduction points, the radially elastic material portion, the annular decoupling region, the weakened sensor portion and the first force introduction points to have a common radial cross-sectional plane. In such a configuration, the first force introduction points, the sensor portion, the annular decoupling region, the radially elastic material portion and the second force introduction points follow one another radially, when seen from radially inward. In addition to their extent in the radial direction, both the sensor portion and the radially elastic material portion and the annular decoupling region as well as the first and second force introduction points have an extent in the axial direction, which is necessary in any case for stability reasons. The first and second force introduction points, the annular decoupling region, the radially elastic material portion and the sensor portion can be arranged overall in the same radial cross-sectional plane (wherein the thickness of this cross-sectional plane then corresponds to the axial extent of the first and second force introduction points, of the annular decoupling region, of the radially elastic material portion and of the sensor portion), but there can also be differences in level between the individual regions, or portions. For example, for reasons of stability, the axial extent of the second force introduction points can be greater than the axial extent of the radially elastic material portion and/or of the sensor portion. Such a common radial cross-sectional plane is beneficial for a small dimension of the torque sensor in the axial direction.

In preferred embodiments of the torque sensor according to the invention, the radially elastic material portion has a series of slots which extend at least substantially in the circumferential direction and which pass through the radially elastic material portion in the axial direction, that is to say extend completely through the radially elastic material portion in the axial direction. These slots extending at least substantially in the circumferential direction only ever extend over part of the circumferential extent of the radially elastic material portion, so that, when seen in the radial direction, material bridges remain, which ensure the mechanical coherence of the torque sensor. The individual slots extending substantially in the circumferential direction can be at different radial distances from a midpoint of the main body of the torque sensor.

The extent of each slot in the circumferential direction can thereby be, for example, in a range of from 25 to 70° and in preferred exemplary embodiments is between about 35 and about 55°. The circumferential extent of each slot can be of equal size, but it is likewise possible to combine in the radially elastic material portion slots with circumferential extents of different sizes. For example, by means of suitably arranged slots with circumferential extents of different sizes, the radial compliance of the radially elastic material portion can be increased or reduced in specific radial directions, should this be desired. The basic principle is that a slot with a larger circumferential extent leads to a higher radial compliance in the region in which such a slot is arranged.

In one embodiment, the slots extending at least substantially in the circumferential direction are each circular-(ring-)segment-shaped. The circular-segment-shaped slots can also be arranged in a plurality of groups, regardless of the size of their circumferential extent. In one embodiment of the torque sensor according to the invention, the circular-ring-segment-shaped slots are arranged in at least two groups, wherein each group is at a different radial distance from a midpoint of the main body, and wherein the circumferential extent of the circular-ring-segment-shaped slots can be the same or different.

According to a further development of the above-mentioned embodiments, the circular-ring-segment-shaped slots of one group are arranged offset in the circumferential direction relative to the circular-ring-segment-shaped slots of another group. According to a further development of such an embodiment, the circular-ring-segment-shaped slots of all the groups are arranged offset in the circumferential direction relative to one another. An offset of the circular-ring-segment-shaped slots in the circumferential direction relative to other circular-ring-segment-shaped slots which are present in the radially elastic material portion facilitates the formation of a torque sensor whose radially elastic material portion, when seen in the circumferential direction, has an at least substantially identical radial compliance throughout.

In another preferred embodiment of the torque sensor according to the invention, the slots extending at least substantially in the circumferential direction have circumferential portions whose radial distance from a midpoint of the main body is different from a radial distance from the midpoint of the main body of other circumferential portions of the slots extending at least substantially in the circumferential direction. In particular, one slot can thereby have circumferential portions whose radial distance from the midpoint of the main body is different in each case. By suitably choosing the extent of the individual circumferential portions in the circumferential direction, and by suitably choosing the radial distance from the midpoint of the main body, radial compliances of the radially elastic material portion can be tailored and in particular made uniform.

According to yet another preferred embodiment of the torque sensor according to the invention, a radial distance from a midpoint of the main body of the slots extending at least substantially in the circumferential direction changes continuously over the profile of a slot. In such an embodiment, the profile of the slots can resemble the arrangement of turbine blades of a turbine wheel, for example.

Regardless of the precise form of the slots, in preferred embodiments of the torque sensor according to the invention at least some of the slots overlap in the circumferential direction. Such an overlapping of slots in the circumferential direction allows radially elastic bending strips to be produced in a structurally simple manner.

It will be appreciated that many of the embodiments mentioned above can be combined with one another. Thus, for example, the arrangement of the slots in groups is not dependent on a circular-ring-segment-shaped form of the slots. Also, slots can overlap in the circumferential direction regardless of their shape and regardless of whether they are arranged in groups or not. Further combinations of the embodiments explained above are possible provided that they are not obviously contradictory.

Irrespective of the embodiments described above, the main body of a torque sensor according to the invention is preferably circular-disk-shaped. Deviations from the circular disk shape can be required by particular installation situations.

The main body of a torque sensor according to the invention, regardless of whether the main body is circular-disk-shaped or not, is further preferably monolithic, that is to say in one piece. The slots in the radially elastic material portion can be produced, for example, by water-jet cutting or laser cutting.

In preferred embodiments of torque sensors according to the invention, strain gauges are used as the measuring transducers. Alternatively or additionally, measuring transducers with fiber Bragg gratings or piezo elements, for example, can be used.

Figures 17, 18, 19, 20:
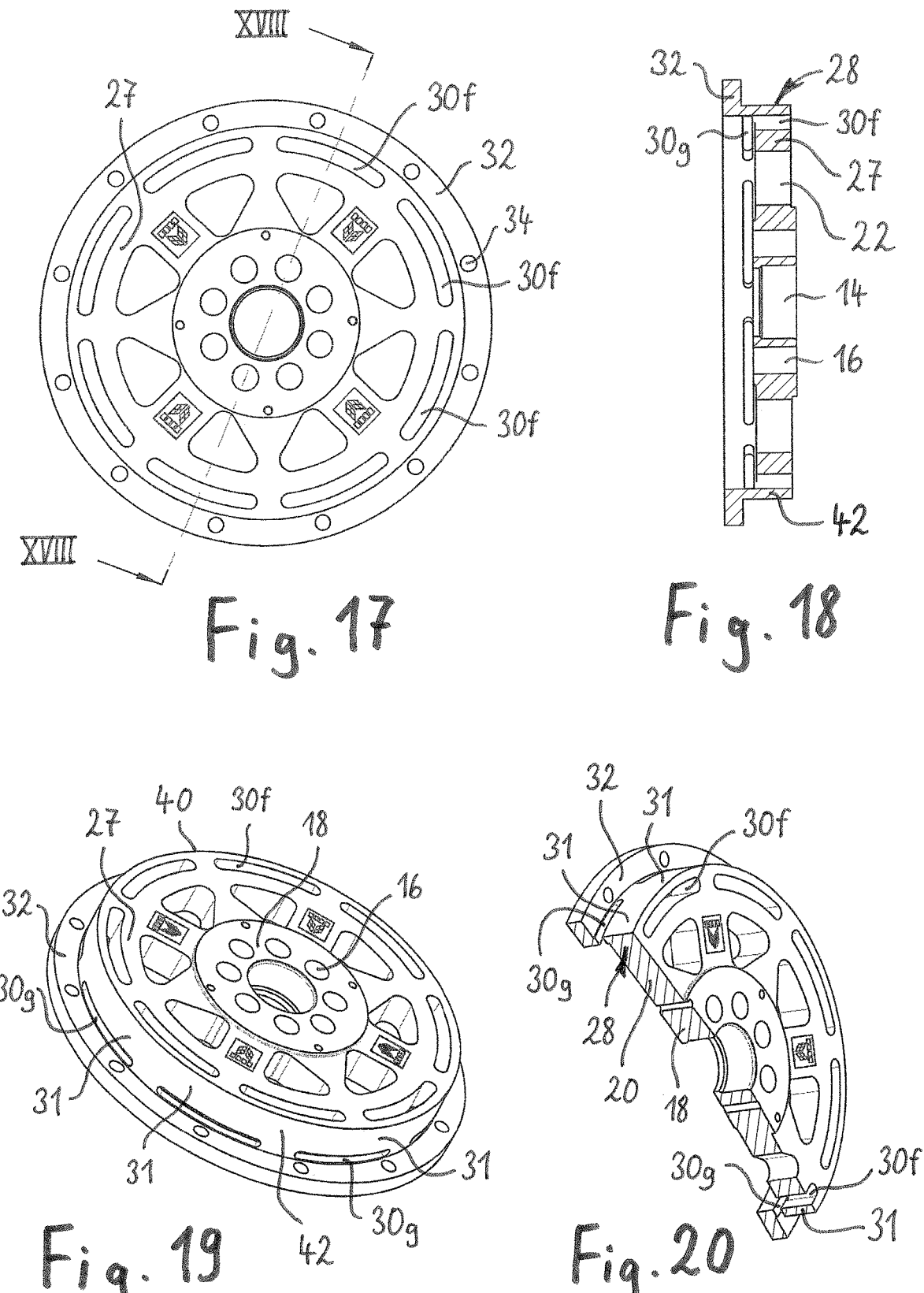
Figure 21:
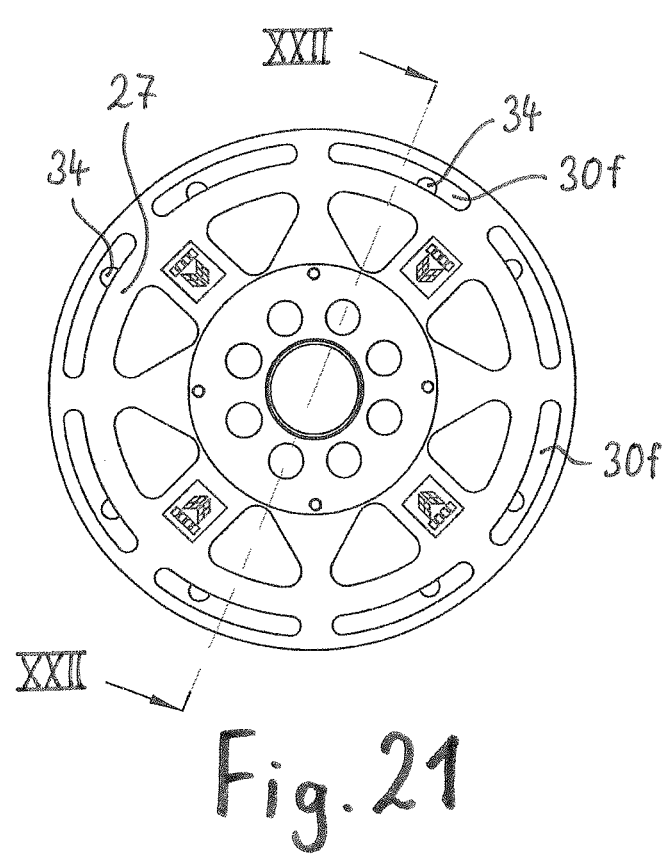
Figure 22:
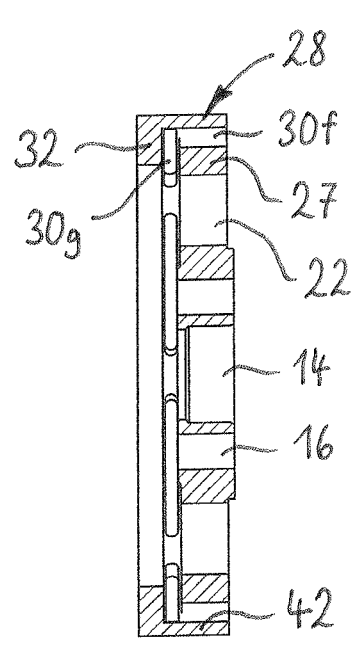
Figure 23:
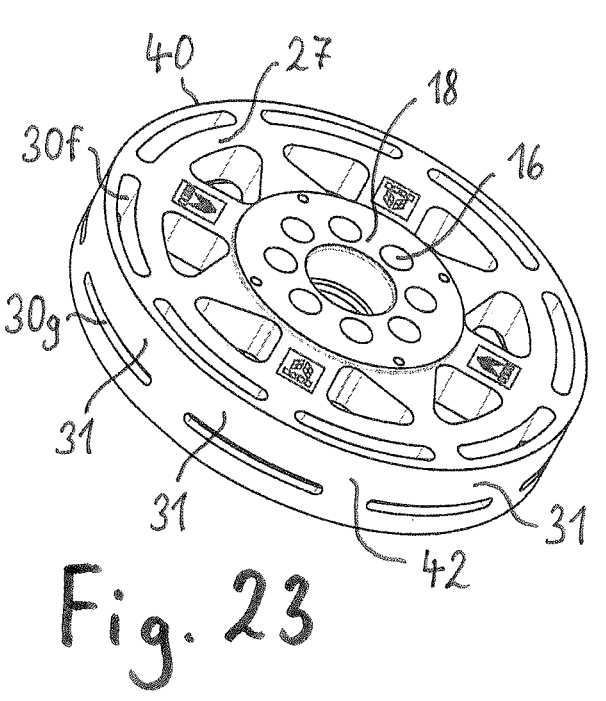
Figure 24:
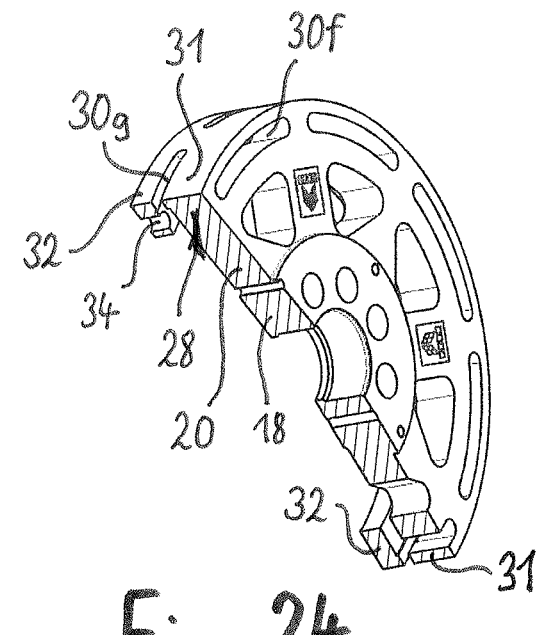

Multiple exemplary embodiments of a torque sensor according to the invention will be explained in greater detail hereinbelow with reference to the accompanying schematic drawings, in which:

FIG. 1 is a plan view of a first embodiment of a torque sensor according to the invention, FIG. 2 shows section II-II from FIG. 1, FIG. 3 shows the first embodiment in a spatial representation obliquely from above, FIG. 4 shows the representation from FIG. 3 in partially cut-open form, FIG. 5 is a plan view of a second embodiment of a torque sensor according to the invention, FIG. 6 shows section VI-VI from FIG. 5, FIG. 7 is a spatial representation of the second embodiment obliquely from above, FIG. 8 shows the representation from FIG. 7 in cut-open form, FIG. 9 is a plan view of a third embodiment of a torque sensor according to the invention, FIG. 10 shows section X-X from FIG. 9, FIG. 11 is a spatial representation of the third embodiment obliquely from above, FIG. 12 shows the representation from FIG. 11 in cut-open form, FIG. 13 is a plan view of a fourth embodiment of a torque sensor according to the invention, FIG. 14 shows section XIV-XIV from FIG. 13, FIG. 15 is a spatial representation of the fourth embodiment obliquely from above, FIG. 16 shows the representation from FIG. 15 in cut-open form, FIG. 17 is a plan view of a fifth embodiment of a torque sensor according to the invention, FIG. 18 shows section XVIII-XVIII from FIG. 17, FIG. 19 is a spatial representation of the fifth embodiment obliquely from above, FIG. 20 shows the representation from FIG. 19 in cut-open form, FIG. 21 is a plan view of a sixth embodiment of a torque sensor according to the invention, FIG. 22 shows section XXII-XXII from FIG. 21, FIG. 23 is a spatial representation of the sixth embodiment obliquely from above, FIG. 24 shows the representation from FIG. 23 in cut-open form, FIG. 25 is a plan view of a seventh embodiment of a torque sensor according to the invention, FIG. 26 shows section XXVI-XXVI from FIG. 25, FIG. 27 is a spatial representation of the seventh embodiment obliquely from above, and FIG. 28 shows the representation from FIG. 27 in cut-open form.

FIGS. 1 to 4 show a first embodiment of a torque sensor 10 according to the invention in different views. The torque sensor 10 has a main body 12, which here is circular-disk-shaped, having a longitudinal center axis A (see FIG. 2) and a midpoint M (see FIG. 1) which here is virtual. In the center of the main body 12 there is an opening 14, which can serve for mounting the torque sensor 10 on an axle or shaft (not shown), for example.

Arranged in the form of a circle around the central opening 14 of the main body 12 are a plurality of first force introduction points 16 (here eight first force introduction points), which together form an annular inner flange 18. In the exemplary embodiments shown, each first force introduction point 16 is a bore which extends axially through the main body 12. Radially outside the annular inner flange 18 is a mechanically weakened sensor portion 20, which is likewise annular. The mechanical weakening of this portion 20 is achieved by a series of annularly arranged apertures 22 in the main body 12, each of which has the shape of a pie segment in the embodiments shown here. The apertures 22 with rounded corners pass completely through the main body 12 in the axial direction. Between the apertures 22 there are formed, alternatingly when seen in the circumferential direction, radially extending measuring spokes 24a and shunt spokes 24b. The measuring spokes 24a are of uniform width and carry measuring transducers 26 (shown only in FIGS. 1, 5 and 9), which are configured to generate electrical output signals. For example, these measuring transducers 26 can be strain gauges which are adhesively bonded to the measuring spokes 24a in known manner. The width of the shunt spokes 24b decreases continuously from radially inward to radially outward.

Radially outwardly adjoining the mechanically weakened sensor portion 20 is a radially stiff, here circular-ring-shaped, decoupling region 27 of the main body 12, which serves to isolate the mechanically weakened sensor portion 20 relative to forces which can occur in a radially elastic material portion 28, which will be described in greater detail hereinbelow, when radially directed forces act on the main body 12.

The radially elastic material portion 28 already mentioned above, which here is likewise circular-ring-shaped, is located radially outside the decoupling region 27 and, owing to its radial compliance, ensures that radially directed forces introduced into the main body 12 do not falsify the measurement result. An exemplary embodiment of a radially elastic material portion 28 will be explained in greater detail hereinbelow.

In the first exemplary embodiment shown in FIGS. 1 to 4, the radially elastic material portion 28 is provided with a series of slots 30a, 30b extending in the circumferential direction, which slots pass completely through the radially elastic material portion 28 and thus the main body 12 in the axial direction. In the first embodiment, each of the slots 30a, 30b is circular-ring-segment-shaped, wherein the slots 30a, 30b are arranged in two groups, a first, radially inner group which consists of slots 30a, and a second, radially outer group which consists of slots 30b. The slots 30a of the radially inner group each have a circumferential extent of about 55°, whereas the extent of each slot 30b of the radially outer group is only about 45°. In other embodiments, the circumferential extent of the slots 30a and 30b can be smaller or larger; the circumferential extent of the slots 30a, 30b can also be of the same size. The slots 30a of the first, radially inner group are all at the same distance from the midpoint M of the main body 12. Likewise, the slots 30b of the second, radially outer group are all at the same distance from the midpoint M of the main body 12, but this radial distance r2 is slightly greater than the radial distance r1 of the first group of slots 30a. As is shown, the slots of the first group 30a overlap the slots 30b of the second group, when seen in the circumferential direction, and each overlapping region thereby forms a radially elastic bending strip 31. In the first embodiment of the torque sensor 10 shown in FIGS. 1 to 4, the radially elastic material portion 28 accordingly has eight radially elastic bending strips 31, which provide the desired radial elasticity of the radially elastic material portion 28.

Radially outside the radially elastic material portion 28 there is an annular outer flange 32 with a plurality of second force introduction points 34 each in the form of a bore, which, like the first force introduction points 16, pass completely through the main body 12 in the axial direction. In the exemplary embodiments shown, the annular outer flange 32 at the same time forms the outer circumference of the main body 12. However, this does not necessarily have to be the case. Instead, depending on the intended application and field of use of the torque sensor 10, there may also be material regions (not shown) radially outside the annular outer flange 32. In order to facilitate correct positioning of the torque sensor 10, a positioning opening 35 is formed in the outer flange 32 at a point between two second force introduction points 34.

In all the embodiments shown here, the main body 12 of the torque sensor 10 is in one-piece, that is to say monolithic, form and has a uniform thickness in the axial direction over its entire radial extent. However, it is also possible to configure the main body 12 in multi-part form. Regardless of whether the main body 12 is of multi-part form or not, it is likewise possible that the thickness of individual portions of the main body in the axial direction differs from the axial thickness of other portions. Thus, for example, the region in which the annular outer flange 32 is located can be designed, for reasons of stability, with a greater axial thickness than the radially elastic material portion 28 and/or the sensor portion 20. The same applies also to the region of the annular inner flange 18 and/or the decoupling region 27. The main body 12 can consist, for example, of aluminum or an aluminum alloy, although other materials, for example steel, are likewise possible.

The radially elastic material portion 28, which owing to the presence of the radially elastic bending strips 31 is elastically compliant in the radial direction and can thus act as a radial compensation region, has the result that a tilting moment acting on the torque sensor 10 about the axis A does not affect the measuring spokes 24*a* on which the measuring transducers 26 are located. A deformation, for example an elliptical or arching deformation, that occurs at the outer flange 32 also does not result in the measuring spokes 24*a* being affected and thus does not lead to a falsification of the output signals generated by the measuring transducers 26. Instead, such an elliptical or arching deformation is effectively absorbed by the radially elastic material portion 28 and kept away from the measuring spokes 24*a* by the decoupling region 31. The bending strips 31 on the one hand provide the desired radial elasticity owing to their more ready deformability in the radial direction but on the other hand have a high deformation resistance in the circumferential direction so that, despite the radially elastic material portion 28, the torque sensor 10 has a high stiffness in the circumferential direction and thus excellent requirements for the good introduction and transmission of a torque to be measured to the measuring spokes 24*a*. This high stiffness in the circumferential direction allows a torque introduced into the torque sensor 10 to be detected precisely.

The second embodiment of the torque sensor 10 shown in FIGS. 5 to 8 differs from the first embodiment shown in FIGS. 1 to 4 only by the configuration of the radially elastic material portion 28. Instead of the circular-ring-segment-shaped slots 30*a* and 30*b* of the first embodiment, slots 30*c* and 30*d* are present in the second embodiment which likewise extend at least substantially in the circumferential direction, wherein each slot 30*c*, 30*d* has at least one circumferential end portion 36*a*, 36*b* whose radial distance from the midpoint M of the main body 12 differs from a radial distance from the midpoint M of the main body 12 of a different circumferential portion 38*a*, 38*b* of the same slot 30*c*, 30*d*. As is clearly apparent from FIG. 5, each slot 30*c* has two circumferential end portions 36*a*, which are located radially further inward, and a middle circumferential portion 38*a*, which is connected to the two circumferential end portions 36*a* by a transition region 37, which here is in the form of a step, and is located radially further outward than the circumferential end portions 36*a*. Similarly, each slot 30*d* has two circumferential end portions 36*b* and a middle circumferential portion 38*b*, wherein, however, the circumferential end portions 36*b* are here arranged radially further outward than the middle circumferential portion 38*b*. As is likewise clearly apparent from FIG. 5, in the exemplary embodiment shown the circumferential end portions 36*b* of the slots 30*d* are at a radial distance from the midpoint M of the main body 12 which corresponds to the radial distance of the middle circumferential portion 38*a* of the slots 30*c*. By contrast, the middle circumferential portion 38*b* of each slot 30*d* is at a radial distance from the midpoint M of the main body 12 that lies between the radial distance of the circumferential end portions 36*a* and 36*b*.

It is further clearly apparent from FIG. 5 that the slots 30*c* and 30*d* overlap in the circumferential direction in the region of their circumferential end portions 36*a* and 36*b* and thereby again form a total of eight radially elastic bending strips 31.

The advantages of the radially elastic material portion 28 which have been explained in connection with the first embodiment likewise apply to the second embodiment.

FIGS. 9 to 12 show a third embodiment of the torque sensor 10, which again differs from the two embodiments explained above only by the configuration of the radially elastic material portion 28. Unlike in the first two embodiments, there are not two groups of slots 30*a*, 30*b* or 30*c*, 30*d* in the third embodiment but merely a plurality of slots 30*e* of uniform design, which in conformity with the first two embodiments extend at least substantially in the circumferential direction. Each slot 30*e* has a circumferential end portion 36*a* and a circumferential end portion 36*b* which are connected together by a step-like transition region 37. The circumferential end portion 36*a* is arranged radially further inward than the circumferential end portion 36*b*. In the region of their circumferential end portions 36*a*, 36*b*, the slots 30*e* overlap in the circumferential direction and thereby form a total of sixteen radially elastic bending strips 31.

The advantages of the third embodiment correspond to those of the first two embodiments.

FIGS. 13 to 16 show a fourth embodiment of the torque sensor 10, which overall is very similar to the first embodiment. As in the first embodiment, the radially elastic material portion 28 has two groups of circular-ring-segment-shaped slots, a radially inner group consisting of slots 30*a* and a radially outer group consisting of slots 30*b*. Unlike in the first embodiment shown in FIGS. 1 to 4, in the fourth embodiment the circumferential extent of each of the slots 30*a*, 30*b* is smaller and each group comprises more slots than in the first embodiment. While in the first embodiment the radially inner group and the radially outer group each contain four slots 30*a* or 30*b*, in the fourth embodiment there are eight slots 30*a* in the radially inner group and eight slots 30*b* in the radially outer group. In the overlapping regions of the slots 30*a* and 30*b* of the radially elastic material portion 28, a total of sixteen radially elastic bending strips 31 is accordingly formed.

The structure of the fourth embodiment otherwise corresponds to the first embodiment, and the advantages explained in connection with the first embodiment apply also to the fourth embodiment.

FIGS. 17 to 20 show a fifth embodiment of the torque sensor 10, the structure of which differs slightly from the embodiments described hitherto. Unlike in the embodiments explained hitherto, in the fifth embodiment the annular outer flange 32 with the second force introduction points 34 is located in a cross-sectional plane which is offset slightly relative to the cross-sectional plane in which the radially stiff decoupling region 27, the mechanically weakened sensor portion 20 and the annular inner flange 18 with the first force introduction points 16 are located. The radially elastic material portion 28 connecting the annular outer flange 32 to the annular decoupling region 27 begins in the plane of the annular decoupling region 27, where it has a first group of circular-ring-segment-shaped slots 30*f*, which here consists of eight slots 30*f*. Each slot 30*f* passes completely through the main body 12 in the axial direction, as in the embodiments described hitherto.

At an outer circumferential edge 40 of the first cross-sectional plane in which the decoupling region 27, the sensor portion 20 and the inner flange 18 are located, the radially elastic material portion 28 bends in an L-shape out of the first cross-sectional plane and, by means of a circular-ring-shaped and axially extending circumferential wall 42, establishes a connection with the second cross-sectional plane in which the annular outer flange 32 is arranged. The annular outer flange 32 extends radially outward from the circular-ring-shaped circumferential wall 42.

In order to form radially elastic bending strips 31, the circular-ring-shaped circumferential wall 42 is provided with a second group of circular-ring-segment-shaped slots 30*g*, which here likewise consists of eight slots 30*g*. Each slot 30*g* passes through the circumferential wall 42 in the radial direction and is so arranged that it overlaps two slots 30*f* of the first group in the circumferential direction. In the exemplary embodiment shown, the slots 30*g* in the circumferential wall 42 are located directly beneath the annular outer flange 32 and above the part of the main body 12 that defines the first cross-sectional plane. However, it is likewise conceivable to move the slots 30g axially closer to the slots 30f, although this involves a greater outlay in terms of manufacture.

As a result of the slots 30f and 30g overlapping in the circumferential direction, radially elastic bending strips 31 are formed in the radially elastic material portion 28, more specifically in the circular-ring-shaped circumferential wall 42, the number of which bending strips is dependent on the number of slots and the number of overlapping regions. In the exemplary embodiment shown here, the radially elastic material portion 28 has, as a result of the mutually overlapping slots 30f and 30g, of which there are in each case eight, a total of sixteen radially elastic bending strips 31.

From a functional point of view, the fifth embodiment behaves exactly like the first four embodiments described above.

FIGS. 21 to 24 show a sixth embodiment of the torque sensor 10, the structure of which is similar to the fifth embodiment explained above. Unlike in the fifth embodiment, however, the annular outer flange 32 extends radially inward from the circular-ring-shaped circumferential wall 42, whereby the second force introduction points 34 are also located radially further inward than in the fifth embodiment, while the dimensions of the torque sensor otherwise remain the same. The structure of the radially elastic material portion 28 corresponds to that of the fifth embodiment.

FIGS. 25 to 28 show a seventh embodiment of the torque sensor 10, the structure of which is similar in principle to the fourth embodiment. The main body 12 of the seventh embodiment, like that of the fourth embodiment, is disk-shaped and monolithic, but its outer form is that of an octagon. It follows that, although the outer flange 32 is annular, it is not circular-ring-shaped. This applies also to the shape of the radially elastic material portion 28 and of the radially stiff decoupling region 27.

The radially elastic material portion 28 also differs slightly in its structure from the embodiments explained hitherto. In conformity with the fourth embodiment, for example, there are a radially inner group of slots and a radially outer group of slots, which in the seventh embodiment consist of eight radially inner slots 30h and eight radially outer slots 30i, but none of the slots 30h, 30i is circular-ring-segment-shaped. Instead, each of the radially inner slots 30h consists of two linear portions which are connected together with a bend, wherein the bend point is in each case located on a radius line which extends from a corner of the octagon to the midpoint of the main body 12. Each of the radially outer slots 30i extends wholly linearly and does not cross any of the radius lines which extend from the corners of the octagon to the midpoint of the main body 12. As shown, the slots 30h and 30i overlap in the circumferential direction, whereby radially elastic bending strips 31, here a total of sixteen bending strips 31, are formed in the overlapping regions.

Despite the slightly different shape of the slots 30h, 30i, the function of the radially elastic bending strips 31 formed thereby in the radially elastic material portion 28 corresponds to the function of the radially elastic bending strips 31 of the embodiments described above. The same advantages are thus also obtained.

It will be appreciated that the torque sensor 10 according to the invention is not limited to the embodiments which have been shown and described. Rather, there are a large number of further possible slot configurations in the radially elastic material portion 28 which likewise result in the desired elasticity in the radial direction while at the same time providing high stiffness in the circumferential direction. Thus, for example, in the seventh embodiment, the bent slots can be arranged radially on the outside and the linear slots can be arranged on the inside or both the radially inner and the radially outer slots can have a bent form. Furthermore, the radially elastic material portion 28 can be provided with a series of slots which extend in the radially elastic material portion 28 in the manner of a turbine blade. Many further slot configurations and possible combinations will be obvious to a person skilled in the art without departing from the basic concept of the present invention.

The invention claimed is:

1. A torque sensor, comprising:
an annular inner flange including first force introduction points,
an annular, radially stiff decoupling region,
a mechanically weakened sensor portion extending between the annular inner flange and the annular, radially stiff decoupling region,
an annular outer flange including second force introduction points,
a radially elastic material portion extending between the annular, radially stiff decoupling region and the annular outer flange, the radially elastic material portion formed by a plurality of radially elastic bending strips distributed over a circumference of the radially elastic material portion, the radially elastic bending strips formed by a series of slots which pass through the radially elastic material portion in an axial or radial direction, the slots extending at least substantially in a circumferential direction of the radially elastic material portion, wherein the slots each have circumferential portions, and at least one of the circumferential portions has a radial distance from a midpoint of the annular inner flange that is different from a radial distance from the midpoint of the annular inner flange of at least one other of the circumferential portions, and
measuring transducers carried by the mechanically weakened sensor portion and configured to generate output signals indicative of torque in the mechanically weakened sensor portion.

2. A torque sensor, comprising:
an annular inner flange including first force introduction points,
an annular, radially stiff decoupling region,
a mechanically weakened sensor portion extending between the annular inner flange and the annular, radially stiff decoupling region,
an annular outer flange including second force introduction points,
a radially elastic material portion extending between the annular, radially stiff decoupling region and the annular outer flange, the radially elastic material portion formed by a plurality of radially elastic bending strips distributed over a circumference of the radially elastic material portion, the radially elastic bending strips formed by a series of slots which pass through the radially elastic material portion in an axial or radial direction, the slots extending at least substantially in a circumferential direction of the radially elastic material portion, wherein a radial distance from a midpoint of the annular inner flange to each of the slots changes continuously over a profile of each slot, and measuring transducers carried by the mechanically weakened sensor portion and configured to generate output signals indicative of torque in the mechanically weakened sensor portion.

3. A torque sensor, comprising:

an annular inner flange including first force introduction points, an annular, radially stiff decoupling region, a mechanically weakened sensor portion extending between the annular inner flange and the annular, radially stiff decoupling region, an annular outer flange including second force introduction points, a radially elastic material portion extending between the annular, radially stiff decoupling region and the annular outer flange, the radially elastic material portion formed by a plurality of radially elastic bending strips distributed over a circumference of the radially elastic material portion, the radially elastic bending strips formed by a series of slots which pass through the radially elastic material portion in an axial or radial direction, at least some of the slots overlapping in a circumferential direction of the radially elastic material portion, and measuring transducers carried by the mechanically weakened sensor portion and configured to generate output signals indicative of torque in the mechanically weakened sensor portion.

4. The torque sensor of claim 3, wherein the slots extend at least substantially in a circumferential direction of the radially elastic material portion.

5. The torque sensor of claim 4, wherein the slots are each circular-ring-segment-shaped.

6. The torque sensor of claim 5, wherein the circular-ring-segment-shaped slots are arranged in at least two groups, wherein each of the at least two groups is at a different radial distance from a midpoint of the annular inner flange.

7. The torque sensor of claim 6, wherein the circular-ring-segment-shaped slots of one of the at least two groups are arranged offset in the circumferential direction relative to the circular-ring-segment-shaped slots of another of the at least two groups.

8. The torque sensor of claim 6, wherein the circular-ring-segment-shaped slots of all the at least two groups are arranged offset in the circumferential direction relative to one another.

9. The torque sensor of claim 3, wherein the plurality of radially elastic bending strips include at least three radially elastic bending strips distributed over a circumference of the radially elastic material portion.

10. The torque sensor of claim 3, wherein the annular inner flange, the mechanically weakened sensor portion, the annular, radially stiff decoupling region, the radially elastic material portion and the annular outer flange together form a main body of the torque sensor, and wherein the radially elastic material portion is circular-disk-shaped.

11. The torque sensor of claim 3, wherein the annular inner flange, the mechanically weakened sensor portion, the annular, radially stiff decoupling region, the radially elastic material portion and the annular outer flange together form a main body of the torque sensor, and wherein the main body is monolithic.

12. The torque sensor of claim 3, wherein the measuring transducers are strain gauges.

13. The torque sensor of claim 3, wherein the second force introduction points, the radially elastic material portion, the annular, radially stiff decoupling region, the mechanically weakened sensor portion and the first force introduction points have a common radial cross-sectional plane.

14. The torque sensor of claim 3, wherein the annular inner flange, the mechanically weakened sensor portion, the annular, radially stiff decoupling region, the radially elastic material portion and the annular outer flange together form a main body of the torque sensor.

15. The torque sensor of claim 3, wherein the main body of the torque sensor is of uniform construction.

* * * * *